UNITED STATES PATENT OFFICE.

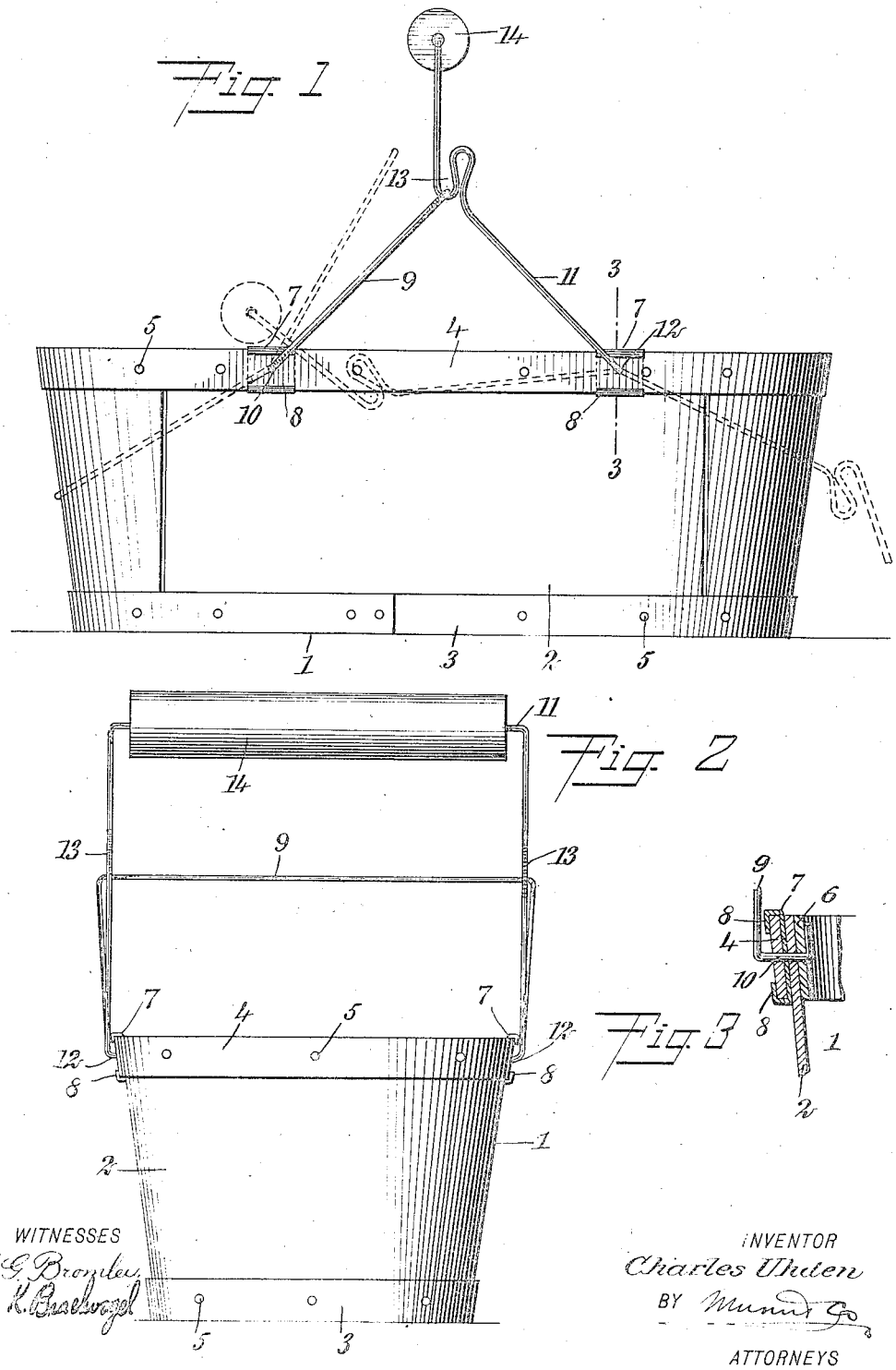

CHARLES UHDEN, OF SPOKANE, WASHINGTON.

RECEPTACLE.

No. 877,811.    Specification of Letters Patent.    Patented Jan. 28, 1908.

Application filed July 3, 1907. Serial No. 382,594.

*To all whom it may concern:*

Be it known that I, CHARLES UHDEN, a citizen of the United States, and a resident of Spokane, in the county of Spokane and State of Washington, have invented a new and Improved Receptacle, of which the following is a full, clear, and exact description.

This invention relates to receptacles and more particularly to receptacles having bail handles.

The object of the invention is to provide a receptacle adapted for use with or without a cover, and having two bails constituting a handle and arranged to be secured one to the other to obviate the danger of permitting one end of the receptacle to fall in case one of the bails slips from the hand of the holder.

A further object of the invention is to provide a simple, inexpensive and durable receptacle, having bails constituting a handle wherewith the receptacle can be conveniently carried.

A still further object of the invention is to provide a receptacle having pivoted bails mounted a suitable distance apart near the upper edges of the receptacle, and having means for removably securing the bails one to the other, one of the bails being provided with a handle for carrying the receptacle.

The invention consists in the construction and combination of parts to be more fully described hereinafter and particularly pointed out in the claims.

Reference is to be had to the accompanying drawings forming a part of this specification, in which similar characters of reference indicate corresponding parts in all the views, and in which Figure 1 is a side elevation of a container showing my invention applied thereto; Fig. 2 is an end view of the device; and Fig. 3 is a section of a detail, on the line 3—3 of Fig. 1.

Before proceeding to a more detailed explanation of my invention it should be understood that in receptacles such as baskets, it is advantageous to provide the same with two bail handles mounted at separated points on opposite sides of the center of the basket rather than with a single bail handle mounted upon the basket or other receptacle, near the center. If a single bail handle is used the latter must be pivoted at the exact center of the receptacle, as otherwise the same will not balance properly. When two bails are used it is easy to carry the receptacle by grasping both of the latter in the hand. However, two bails thus used together form an awkward handle, and in case one is permitted accidentally to slip from the hand the receptacle will be let down at the corresponding end and the contents thereof will in all probability, be spilled or scattered.

In my invention I provide two bails and means for locking the same together, one of the bails being provided with a handle adapted to be grasped in the hand of the holder; thus, there is no possibility of the slipping from the grasp of one of the bails, and at the same time a convenient and comfortable handle for carrying the receptacle, is provided. As the bails are locked together removably, they can when separated, be swung over the ends of the receptacle, and thus the latter can be used with a cover if so desired, for the bails will not interfere with the operation of the cover.

Referring more particularly to the parts, 1 represents a container which may be of any preferred or common form, and is shown in the illustration as a wood-veneer fruit basket of the ordinary type. The container consists of side walls 2 formed from strips of wood-veneer held in position by top and bottom bands 3 and 4 respectively, of similar material. The bands are secured in place and are fastened to the walls by means of rivets 5. At the upper edge or rim of the container a second inner band 6 is provided, to strengthen the container. At corresponding points of the rim at opposite sides of the receptacle are arranged clips 7, preferably of sheet metal and located between the band 4 and the wall 2. The clips 7 have the edges turned over and clamped at the upper and lower edges respectively, of the band 4.

I provide a bail 9, preferably formed from stiff wire or the like and having the ends formed into inwardly disposed hooks 10, arranged in suitable openings extending through the bands 4 and 5, the clips 7 and the wall 2 of the receptacle at opposite sides of the latter. A second bail 11 having the ends formed into hooks 12, is similarly mounted at the rim of the container. The bails 9 and 11 can swing freely about their pivotal points, and can be turned over the ends of the container to permit the use of a cover upon the latter. The bail 9 is of greater width than the bail 11. The latter has its sides bent and formed into loops 13 at corresponding points. It is further provided with a handle 14, loosely mounted upon the cross piece of the bail, which is of greater length than the bail 9. The sides of the bail 11 beyond the loops 13, are disposed at an angle with the portions of the sides between the loops and the hooks 12, so that when the bails 9 and 11 are arranged in position, the handle 14 is located centrally with respect to the container.

As the bail 9 is wider than the bail 10, the former can be passed over the latter and the cross-piece of the bail 9 slipped into engagement with the loops 13 of the bail 11, thereby removably locking the bails together, as is most clearly shown in Fig. 1. When the bails are in this position the handle 14 can be conveniently grasped and the receptacle comfortably carried in the hand.

It will be understood that the bails can be pivotally mounted upon the receptacle in any desired manner; and that the clips 7 are not an essential part of my invention, constituting merely a preferred form of attachment.

Having thus described my invention I claim as new, and desire to secure by Letters Patent:—

A receptacle having a bail pivotally connected with the sides thereof near each end, one of said bails being of lesser width than the other bail, and being provided with loops on the side members thereof, for engagement by the other bail, the portion of said bail above the loops being bent at an angle to the remaining portion of the bail, and provided with a handle for the purpose set forth.

In testimony whereof I have signed my name to this specification in the presence of two subscribing witnesses.

CHARLES UHDEN

Witnesses:
MARY PETERSON,
ELLA RALPH.